UNITED STATES PATENT OFFICE.

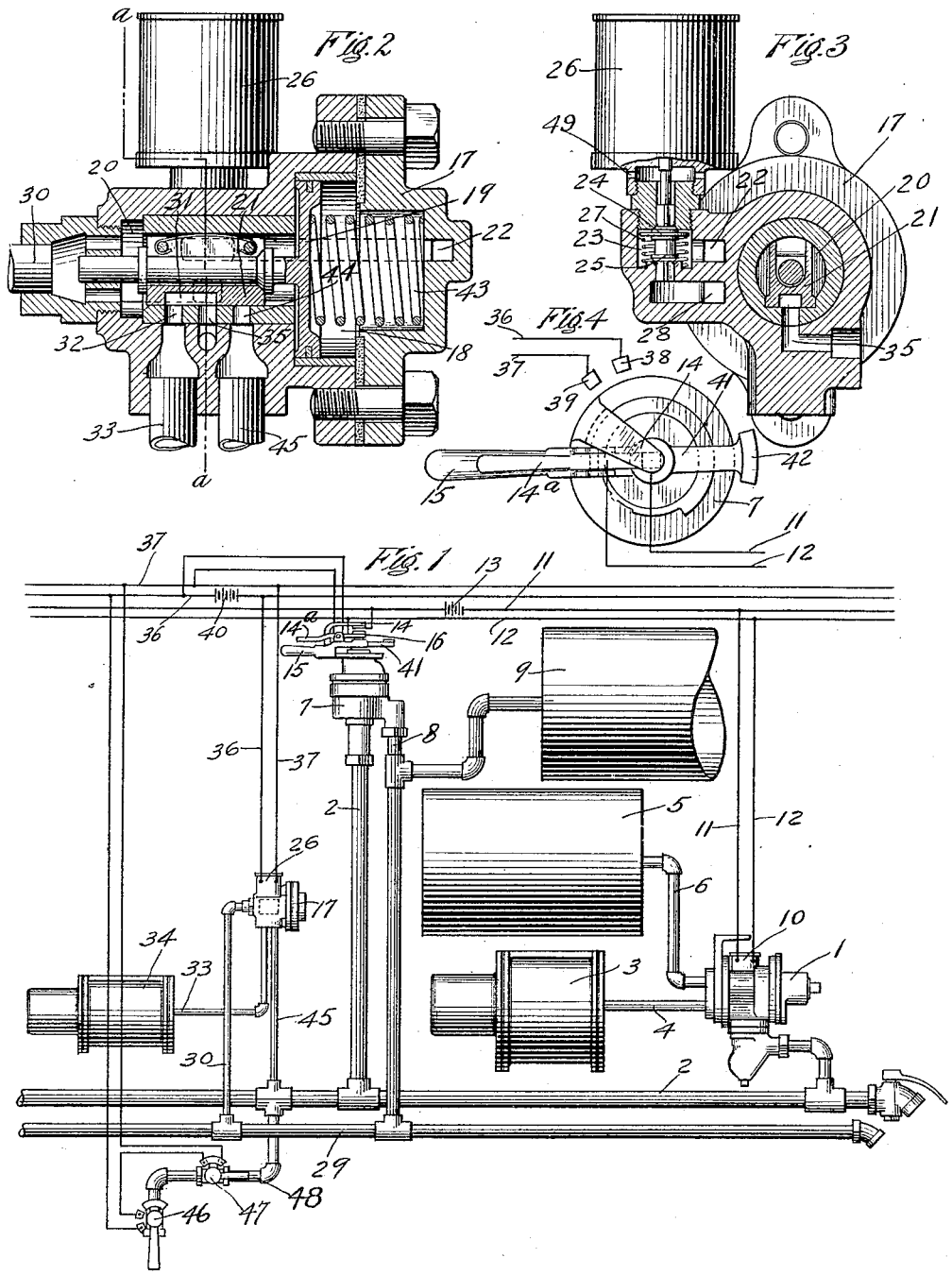

JOHN W. CLOUD, OF LONDON, ENGLAND, ASSIGNOR TO THE WESTINGHOUSE AIR BRAKE COMPANY, OF WILMERDING, PENNSYLVANIA, A CORPORATION OF PENNSYLVANIA.

ELECTROPNEUMATIC BRAKE.

1,134,440.  Specification of Letters Patent.  Patented Apr. 6, 1915.

Application filed December 20, 1913. Serial No. 807,810.

*To all whom it may concern:*

Be it known that I, JOHN W. CLOUD, a citizen of the United States, and a resident of London, England, have invented a certain new and useful Improvement in Electropneumatic Brakes, of which the following is a specification.

This invention relates to fluid pressure brakes, and more particularly to an electropneumatic brake equipment.

The principal object of my invention is to provide an electro-pneumatic brake having improved means for securing an emergency application of the brakes.

Other objects and advantages will appear in the following more detailed description of my invention.

In the accompanying drawing; Figure 1 is a diagrammatic view of an electro-pneumatic brake equipment for one car, with my improvements applied thereto; Fig. 2 a central sectional view of the electro-pneumatic emergency valve device; Fig. 3 a section thereof, on the line *a—a* of Fig. 2; and Fig. 4 a plan view of the electro-pneumatic brake valve device.

As shown in Fig. 1 of the drawing, the car equipment may comprise a triple valve device 1 connected to the brake pipe 2, a brake cylinder 3 connected to the triple valve device by pipe 4, an auxiliary reservoir 5 having a pipe 6 leading to said triple valve device, and a brake valve 7 having a main reservoir pipe 8 communicating with the main reservoir 9. An electro-magnetically controlled valve device 10 is employed for controlling the triple valve exhaust port, so as to provide for releasing the brakes electrically, the electro-magnet of said device being connected to train wires 11 and 12. The train wire 11 is connected to a suitable source of electric current, such as the battery 13, and leads to a stationary contact 14 carried by the brake valve 7. The other release train wire 12 is connected to a contact lever 14ª, pivotally mounted on the usual brake valve handle 15 and provided with a contact 16 adapted to engage with the contact 14 in any position of the brake valve handle, upon the application of pressure on the gripping end of the lever 14ª.

The electro-pneumatic emergency valve device may comprise a casing 17 having a piston chamber 18 containing a piston 19 and a valve chamber 20 containing a slide valve 21 adapted to be operated by the piston 19. The piston chamber 18 is open to a passage 22 which leads to a chamber 23 containing oppositely facing valves 24 and 25 adapted to be operated by an electro-magnet 26. When the magnet 26 is deënergized, the valves 24 and 25 are forced upwardly by spring 27, seating the valve 24 and unseating the valve 25, so as to establish communication from passage 22 to a passage 28 which opens into valve chamber 20. The valve chamber 20 is connected to main reservoir pipe line 29 by pipe 30, so that fluid at main reservoir pressure is supplied to valve chamber 20 and also through passages 28 and 22 to piston chamber 18. The slide valve 21 has a cavity 31 adapted in the normal release position to connect passage 32 leading to pipe 33 and an emergency brake cylinder 34 with an exhaust port 35. The emergency electro-magnet 26 is connected to train wires 36 and 37 leading respectively to contacts 38 and 39 associated with the brake valve 7, the train wire 36 being connected to a source of current, such as the battery 40. The brake valve handle 15 may be provided with an arm 41 having a contact 42 at its end which is adapted in the emergency position of the brake valve handle to connect the contacts 38 and 39.

In operation, the pneumatic portion of the brake equipment is charged with fluid under pressure in the usual way and fluid at main reservoir pressure is supplied to valve chamber 20 of the emergency valve device, and the magnet 26 being deënergized, the piston chamber 18 is also charged through passage 22. The opposing fluid pressures on the piston 19 are thus equalized and a spring 43 acting on piston 19 forces the parts to normal release position, in which the emergency brake cylinder 34 is connected to the exhaust. If an emergency application of the brakes is desired, the brake valve handle is thrown to emergency position and the emergency circuit is closed through contacts 38 and 39. The emergency magnet 26 is thereupon energized and operates to seat valve 25 and open the valve 24. Fluid under pressure is then vented from piston chamber 18 through passage 22 past the valve 24 to the atmospheric port 49 and the main reservoir pressure in valve chamber 20 operates to shift piston 19 and slide valve 21 to emergency position. In this position, the port 32 is uncovered, so that fluid from the main reservoir flows through pipe 33 to the emergency brake cylinder and cavity 31 connects passage 44, leading to pipe 45 and the brake pipe, with exhaust port 35. The brake pipe is thus vented to effect a local reduction in brake pipe pressure and thus cause a pneumatic emergency application by operation of the usual pneumatic brake. Upon deënergization of the emergency magnet 26, the valves 24 and 25 are operated to again establish communication from the passage 28 to passage 22, so that the fluid pressures on opposite sides of the piston 19 are equalized and the piston is returned to normal position with the valve 21 connecting the emergency brake cylinder to the exhaust. The electric emergency circuit may also be controlled by contacts applied to a trip cock 46, so that when the trip cock is actuated, the emergency circuit is closed to effect an emergency application of the brakes. The cut-out cock 47 located in the vent pipe 48 leading to the trip cock 46 may be provided with contacts for also controlling the electric emergency circuit, in order to cut out the electric action of the trip cock when the cut-out cock is in its closed position, the circuit being closed when the cut-out cock is in its open position. The release of the brakes may be controlled electrically by manipulation of the auxiliary lever 14ª of the brake valve. When the release circuit is closed, the magnet 10 is energized and operates to close the electric release valve controlling the brake cylinder exhaust and by this means, the release of the brakes may be graduated and the brakes may also be held applied while the auxiliary reservoirs are being recharged. It will be understood that the emergency brake cylinder 34 is connected up to the usual brake rigging of the car, so that the usual brake cylinder 3 may operate independently to effect an application of the brakes while in an emergency application, the force of the emergency brake cylinder is added to that of the usual brake cylinder.

Having now described my invention, what I claim as new and desire to secure by Letters Patent, is:—

1. The combination with a brake cylinder and fluid pressure controlled means for supplying fluid to said brake cylinder, of an emergency brake cylinder, a source of fluid pressure, and electrically controlled valve means for supplying fluid from said source to the emergency brake cylinder and for releasing fluid from the brake cylinder.

2. The combination with a brake cylinder and fluid pressure controlled means for supplying fluid to said brake cylinder, of an emergency brake cylinder, a source of fluid pressure, a valve for controlling communication from said source to the emergency brake cylinder and from the brake cylinder to the exhaust, and an electro-magnet for controlling said valve.

3. The combination with a brake pipe and means operated upon a reduction in brake pipe pressure for effecting an application of the brakes, of an electrically controlled valve device for supplying fluid to effect an emergency application of the brakes and for venting fluid from the brake pipe to the atmosphere.

4. The combination with a brake pipe and means subject to variations in brake pipe pressure for normally controlling the brakes, of an emergency brake cylinder, a source of fluid pressure, and an electrically controlled valve device adapted to supply fluid from said source to the emergency brake cylinder and vent fluid from the brake pipe to the atmosphere to effect a sudden reduction in brake pipe pressure.

5. The combination with a brake pipe, brake cylinder, auxiliary reservoir, and a triple valve device operated upon a reduction in brake pipe pressure for supplying fluid from the auxiliary reservoir to the brake cylinder, of a main reservoir, an emergency brake cylinder, and an electrically controlled valve device for supplying fluid directly from the main reservoir to the emergency brake cylinder.

6. The combination with a brake pipe, brake cylinder, auxiliary reservoir, and a triple valve device operated upon a reduction in brake pipe pressure for supplying fluid from the auxiliary reservoir to the brake cylinder, of a main reservoir, an emergency brake cylinder, and an electrically controlled valve device for supplying fluid directly from the main reservoir to the emergency brake cylinder and for venting fluid from the brake pipe to effect an emergency reduction in brake pipe pressure.

In testimony whereof I have hereunto set my hand.

JOHN W. CLOUD.

Witnesses:
B. WESTAULT,
A. K. BERGIN.

Copies of this patent may be obtained for five cents each, by addressing the "Commissioner of Patents, Washington, D. C."